E. WILLIAMS.
DETACHABLE EMERGENCY TREAD.
APPLICATION FILED MAY 10, 1921.

1,402,987.

Patented Jan. 10, 1922.

Inventor:
Eli Williams
By Young & Young
Attorneys

UNITED STATES PATENT OFFICE.

ELI WILLIAMS, OF INGALLSTON, MICHIGAN.

DETACHABLE EMERGENCY TREAD.

1,402,987.  Specification of Letters Patent.  Patented Jan. 10, 1922.

Application filed May 10, 1921. Serial No. 468,375.

*To all whom it may concern:*

Be it known that I, ELI WILLIAMS, a citizen of the United States, and resident of Ingallston, in the county of Menominee and State of Michigan, have invented certain new and useful Improvements in Detachable Emergency Treads; and I do hereby declare that the following is a full, clear, and exact description thereof.

This invention has reference generally to improvements in vehicle wheels and more particularly relates to an emergency tread or shoe for automobile wheels.

The invention has for its primary aim and object the provision of a device of the above mentioned character designed to be detachably placed about the rim of a wheel, in place of a punctured tire, the purpose being to permit the driver of the vehicle to run the same to a repair station, thereby preventing damaging of the rim of the wheel.

More particularly the invention consists in the provision of a device of the above-mentioned character which is constructed in sections so that it may be quickly applied to and removed from position, the locking means for retaining the device in position being of an adjustable nature, to adapt the device to rims of slightly varying diameters.

It is a more specific object of the invention to provide a device of the above mentioned character, wherein improved means is employed movably and detachably connecting the other adjacent ends of the sections of the tread together.

Among the other aims and objects of the invention may be recited the provision of a device of the above-mentioned character with a view to compactness, and wherein the number of parts are comparatively few, the construction simple, the cost of production low and the efficiency high.

Other objects as well as the nature, characteristic features, and scope of this invention will be more readily apparent from the following description taken in connection with the accompanying drawings and pointed out in the claims forming a part of this specification.

The invention is clearly illustrated in the accompanying drawings in which:—

Figure 3 is a similar view taken on line 3—3 of Figure 1.

Similar characters of reference are employed in all of the above described views to indicate corresponding parts.

Figure 5:
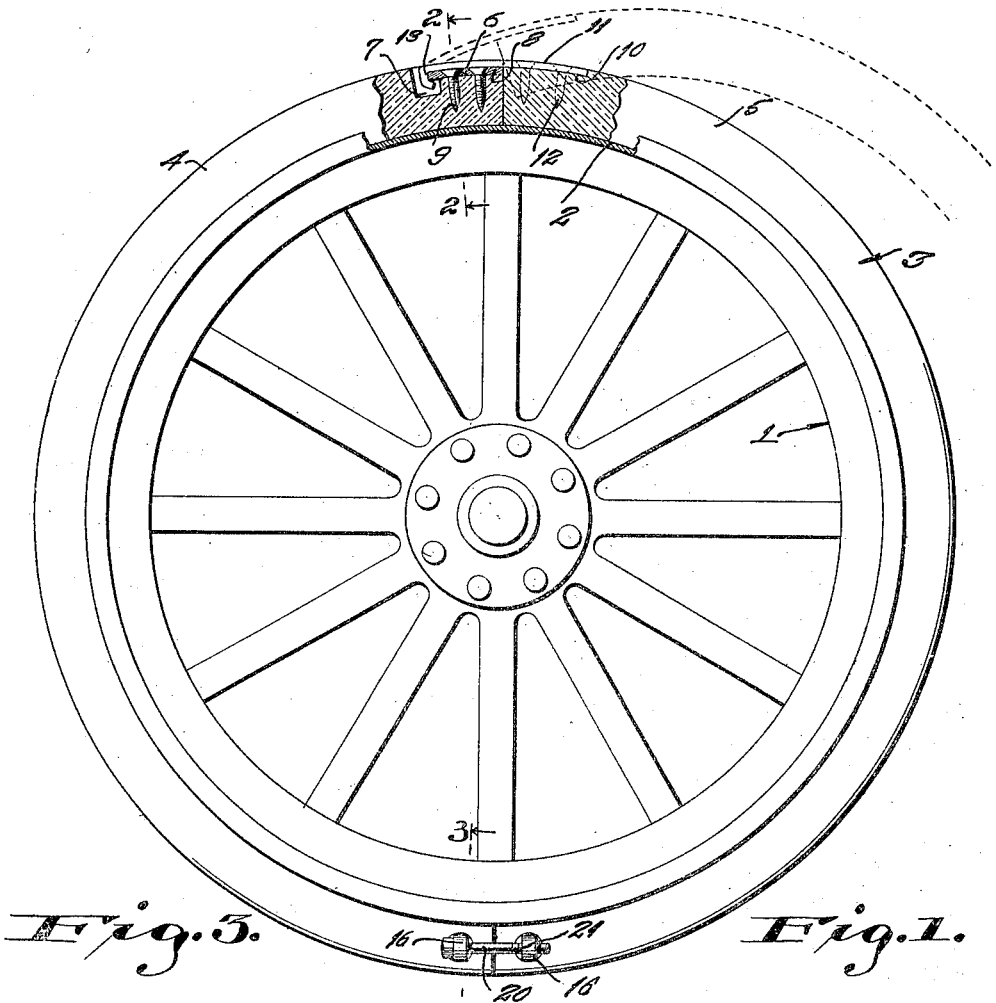
Figure 1:
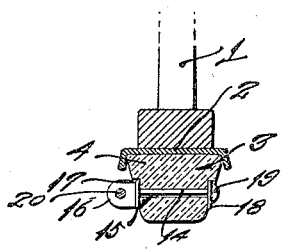
Figure 1 is a side elevational view partly in section of a wheel showing the improved tread applied to the rim thereof.
Figure 2:
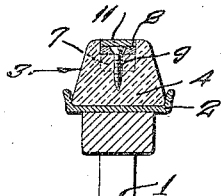
Figure 2 is a transverse section taken on line 2—2 of Figure 1 in the direction in which the arrows point.

Referring now more particularly to the drawings there is provided a wheel 1 about the flanged rim 2 of which is detachably mounted the improved emergency tread generally designated by the numeral 3.

With a view toward reducing the present invention to practice, the tread is constructed of sections 4 and 5, preferably semicircular and formed desirably, though not necessarily, of wood. At abutting ends the section 4 is provided on its outer tread surface with a longitudinal groove 6 extending from the edge and terminating in a recess 7. A keeper plate 8 is secured to the bottom of the groove by suitable fastening means, such as screws 9, so that the inner end portion of the plate extends into the recess 7 while the outer end lies flush with the end of the section 4. The other section 5 is provided with a longitudinal groove 10 on its tread portion, said groove opening at the adjacent edge of the section 5 and arranged in alignment with the groove 6. A hook-like catch generally designated by the numeral 11 and formed desirably of strap metal has its inner end secured by suitable fastening means, such as screws 12 to lie within the groove 10 and flush with the outer periphery of the section. The bill 13 of the hook is designed to lie within the recess 7 and engage the projecting inner end of the keeper plate 8, the shank portion of the hook overlying the keeper plate and lying within the groove 6 so as to be flush with the outer periphery of the section 4. The foregoing keeper plate and hook form the preferred means for movably connecting the adjacent ends of the sections 4 and 5 together so that they may be readily connected and swung into position about the rim or removed therefrom, as is apparent.

For the purpose of providing adjustable locking means to adapt the device for adjustment on rims of slightly varying diameters, the opposite adjacent ends of the sections are formed with transverse openings 14 through which are arranged suitable bolts 15, the heads of which are shaped to form apertured ears or lugs 16 and embrace shoulders 17 formed on the sides of the sections 4 and 5, while the opposite or outer ends of the bolts are preferably fitted with washers 18, the extreme terminals being riveted as at 19 so as to be retained in position. An elongated screw bolt 20 is now employed and is slidably engaged through one of the apertured ears and has its outer threaded portion 21 adjustably engaged with the correspondingly threaded ear for retaining the sections in substantially rigid relation with respect to each other, when arranged about the rim. By reason of the threaded portion 21 of the bolt 20, it is apparent that the device is capable of attachment to rims of varying diameters, the bolt 20 of course lying to one side of the tread and across the adjacent edges. By removing the bolt it is apparent that the device may be quickly detached from the position shown.

In view of the foregoing description it is believed that a further detailed description of the invention is entirely unnecessary. Likewise it is believed that the advantages of the invention will be readily apparent.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:

The combination with the flanged rim of a wheel, of a detachable emergency tread composed of a pair of semi-circular sections, a keeper plate embedded in the outer surface of one section near one end, a hook-like catch embedded in the outer surface of the other section and lying flush therewith and extending beyond the end edge of the section to overlie and engage the keeper plate in the first mentioned section, and locking means for adjustably and detachably connecting the opposite adjacent ends of the sections together when arranged about the flanged rim of the wheel.

In testimony that I claim the foregoing I have hereunto set my hand at Ingallston, in the county of Menominee and State of Michigan.

ELI WILLIAMS.